United States Patent [19]

Liskey

[11] Patent Number: 5,076,366
[45] Date of Patent: Dec. 31, 1991

[54] HEEL SOCK FOR HORSESHOE

[75] Inventor: William D. Liskey, Livermore, Calif.

[73] Assignee: Larry L. Mitchell, Pleasanton, Calif.; a part interest

[21] Appl. No.: 607,219

[22] Filed: Oct. 30, 1990

Related U.S. Application Data

[63] Continuation of Ser. No. 385,133, Jul. 25, 1989, abandoned.

[51] Int. Cl.[5] .................................................. A01L 7/02
[52] U.S. Cl. .......................................... 168/12; 168/13
[58] Field of Search ................................ 168/12-15, 168/41, 43, 39, 26, 28, 34, 31, 38

[56] References Cited

U.S. PATENT DOCUMENTS

| 534,811 | 2/1895 | Buengers | 168/13 |
| 592,277 | 10/1897 | Carswell | 168/13 |
| 606,875 | 7/1898 | McDonough | 168/33 |
| 648,879 | 5/1900 | Paar | 168/13 |
| 649,058 | 5/1900 | Judsen | 168/32 |
| 817,581 | 4/1906 | McGann | 168/34 |
| 878,730 | 2/1908 | Johnson et al. | 168/12 |
| 971,138 | 9/1910 | McCormick | 168/12 |
| 1,140,851 | 5/1915 | Robins | 168/33 |
| 1,175,798 | 3/1916 | Nicholas | 168/11 |
| 1,250,485 | 12/1917 | Morck | 168/43 |
| 1,373,118 | 3/1921 | Douglas | 168/32 |
| 1,390,171 | 9/1921 | Slater | 168/32 |
| 2,149,535 | 3/1939 | Miöen | 168/43 |
| 3,811,512 | 5/1974 | Sirles | 168/34 |
| 4,760,885 | 8/1988 | Benning | 168/43 |

FOREIGN PATENT DOCUMENTS

| 684839 | 7/1930 | France | 168/12 |
| 225461 | 12/1924 | United Kingdom | 168/12 |

Primary Examiner—John G. Weiss
Attorney, Agent, or Firm—Townsend and Townsend

[57] ABSTRACT

A heel sock for a horseshoe and formed of a tubular body of yieldable material, such as rubber, neoprene or plastic, such as polyurethane. The body is open at one end and has means at the opposite end for limiting the extend to which the body can be placed on the heel end of a horseshoe. The inner surface of the body will frictionally engage the outer surface of the heel of the horseshoe. A nail can be driven into and through the shoe and into the hoof of the horse. The body can have a projection thereon and integral therewith. In one version, the projection is between the ends of the body and in another version, the projection is near the closed end of the body. The projections give added traction required for muddy or grassy surfaces. In another version of the sock body, the normally lower wall of the body can be wedge-shaped to elevate the heel of the horse in case the hoof surface has been worn or rasped down too much.

8 Claims, 1 Drawing Sheet

U.S. Patent    Dec. 31, 1991    5,076,366
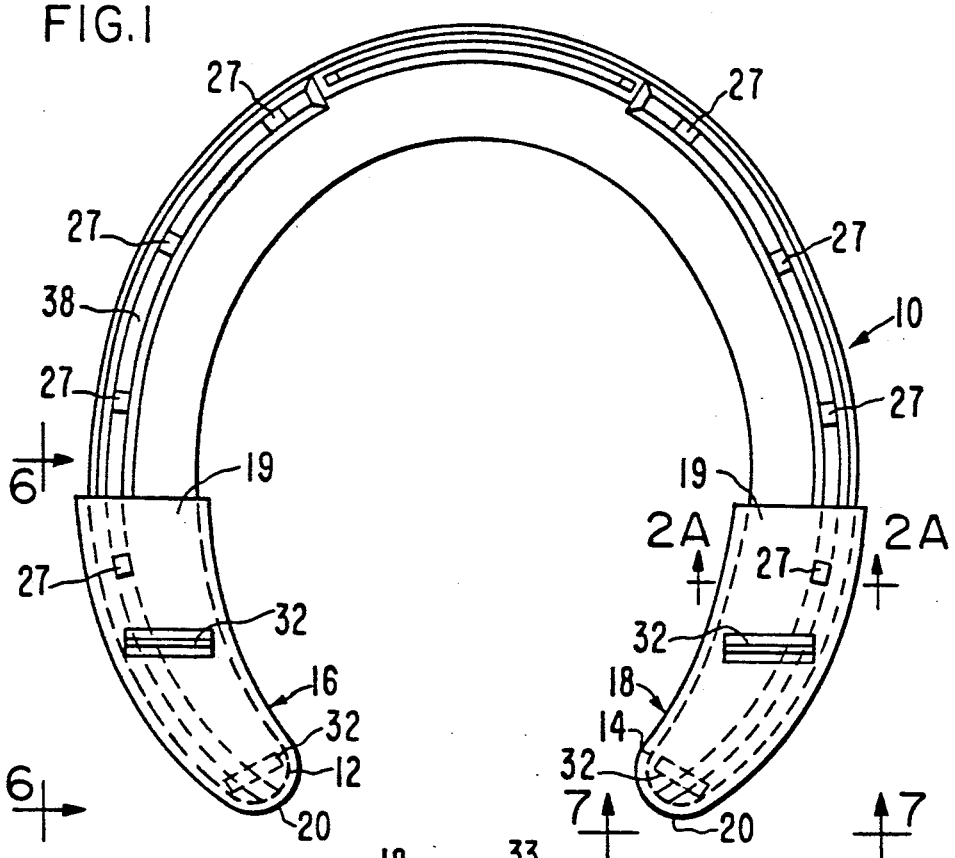
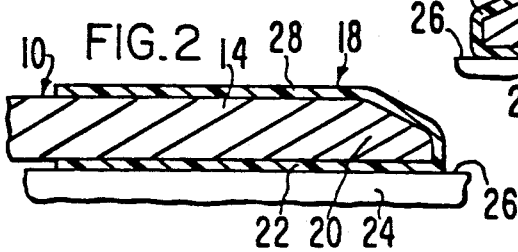
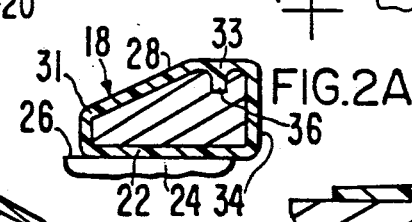
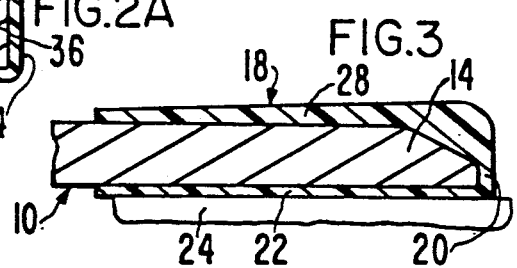
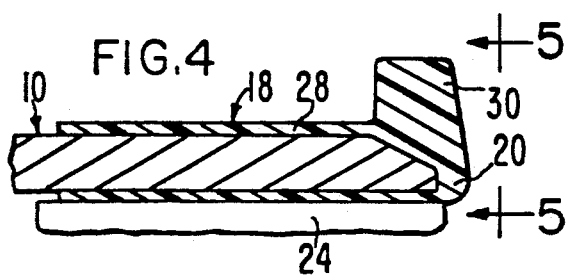
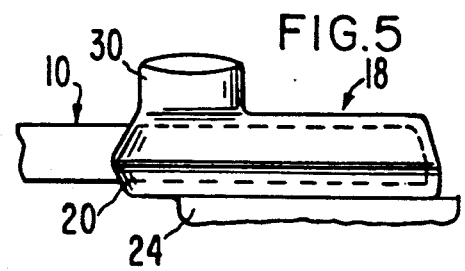
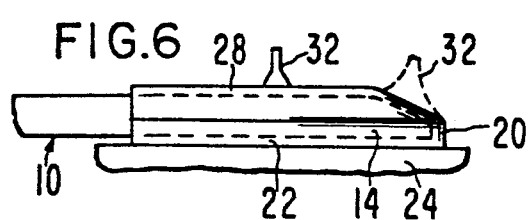
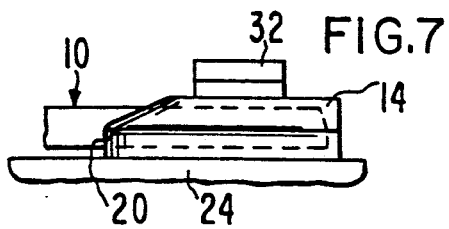

HEEL SOCK FOR HORSESHOE

This is a continuation of application Ser. No. 07/385,133, filed July 25, 1989, now abandoned.

This invention relates to improvements in the shoeing of horses and, more particularly, to a tubular sock adapted to be placed on the heel of a horseshoe.

BACKGROUND OF THE INVENTION

The use of heel and toe calks for horseshoes has been known for a number of years. Disclosures which shows such calks are set forth in the following U.S. Pat. Nos. 606,875 1,250,485 649,058 1,373,118 971,138 1,390,171 1,140,851 2,149,535 1,175,798 4,760,885.

While the calks shown in the aforesaid patents are used on horseshoes when a horse is allowed to run over muddy or icy surfaces, the patents do not specifically teach or suggest a sock for use on the heel end of a horseshoe for solving certain problems associated with the shoeing of a horse. Such calks are difficult to work with and it is a problem to securely attach them to the hooves of a horse so that the horse can run over muddy and grassy surfaces and while keeping positive traction with the ground surface substantially at all times.

Because of the drawbacks associated with the calks of the prior art, a need has existed for some time for improvements in accessories for horseshoes which minimize the cost and time involved in shoeing a horse while still allowing the horse to run on muddy and grassy surfaces and while permitting the horse's hoof to be fitted to a particular horseshoe. The present invention satisfies this need by providing an improved sock formed of yieldable material which is adapted to fit on the heel end of a horseshoe and to become a part of the horseshoe when the horseshoe is attached to the hoof of a horse.

SUMMARY OF THE INVENTION

The present invention provides a heel sock formed of a tubular body of yieldable material, such as rubber, neoprene or plastic, such as polyurethane. The body is open at one end and has means at the opposite end for limiting the extend to which the body can be placed on the heel end of a horseshoe. Such means is typically a closed end for the body.

Typically, the body is of a length of 2" to 3" and the inner surface of the body will be complemental to the outer surface of the heel of a horseshoe. Thus, the inner surface of the body will frictionally engage the outer surface of the heel portion of the horseshoe and thereby be at least partially coupled to the horseshoe.

The material of the body can be clear or translucent and can be pierced with a shoe nail, so that the nail can be driven into and through the shoe and into the hoof of the horse. Only a single nail at the heel end of the horseshoe is used to secure the sock to the shoe and to the hoof of the horse.

A first embodiment of the sock includes a body having a pair of opposed upper and lower walls with one of the walls adapted to be adjacent and be in engagement with the hoof with the other wall being the ground engaging wall of the sock. A pair of socks on the heels of a horseshoe reduce wear of the shoe.

In a second embodiment, the body of the sock has a projection thereon and integral therewith on the bottom wall of the body. In one version, the projection is between the ends of the body and in another version, the projection is near the closed end of the body. These two versions are provided to give variations in the traction required for muddy or grassy surfaces and to provide a horse with greater stability on such surfaces.

In still another version of the sock body, the normally lower wall of the body can be wedge-shaped to orient the shoe relative to a hoof surface which has been worn or rasped down too much. Thus, the shoe can accommodate the worn hoof without affecting the connection between the hoof and the shoe.

The sock of the present invention can be used on the shoes of racing horses, saddle horses, plow horses, jumping horses, and all equine animals.

The primary object of the present invention is to provide a heel sock for a horseshoe wherein the sock fits over the heel end of a horseshoe and can be used to condition the hoof of a horse for running over muddy and grassy surfaces or to orient the hoof at an angle relative to the ground, all of which can be accommodated without affecting the positive attachment of the shoe to the hoof of a horse.

Other objects of this invention will become apparent as the following specification progresses, reference being had to the accompanying drawings for illustrations of several embodiments of the heel sock of the present invention.

BRIEF DESCRIPTION OF THE DRAWINGS

FIG. 1 is a bottom plan view of a conventional horseshoe to be secured by nails to the hoof of a horse, showing the sock of the present invention on each heel, respectively, of the shoe;

FIG. 2 is a fragmentary cross-sectional view of the sock on the heel of the shoe, the walls of the sock being uniformly thick;

FIG. 2A is a cross-sectional view taken along line 2A—2A of FIG. 1;

FIG. 3 is a view similar to FIG. 2 but showing another embodiment of the sock with the lower wall of the shoe progressively decreasing in thickness as the heel of the shoe is approached;

FIG. 4 is a view similar to FIG. 2 but showing a projecting block near the closed end of the sock;

FIG. 5 is an end elevational view looking in the direction of line 5—5 of FIG. 4;

FIG. 6 is a fragmentary, side elevational view looking in the direction of line 6—6 of FIG. 1; and FIG. 7 is an end elevational view looking in the direction of line 7—7 of FIG. 1.

DETAILED DESCRIPTION OF THE DRAWINGS

The heel sock forming the subject of the present invention is adapted for use on a conventional metallic horseshoe 10 having heels 12 and 14. Heel socks 16 and 18 are provided for respective heels 12 and 14 as shown in FIG. 1. Except for the fact that socks 16 and 18 are specifically made to fit on respective heels 12 and 14, the socks are identical with each other so that a description of one sock will suffice for a description of the other sock. For purposes of description, sock 18 will be described.

Sock 18 is shown in detail in FIGS. 1, 2 and 2A. The sock is tubular, is open at one end 19 and has means at the opposite end thereof to limit the extent to which the sock can be moved onto the heel. Preferably, the sock is closed at the other end 20. End 20 is the outer end of the sock and it covers the adjacent outer end of heel 14.

Sock 18 is tubular so that it can fit over heel 14 as shown in FIGS. 2 and 2A. To this end, sock 18 has a first wall 22 which is the upper wall when the shoe 10 is on the hoof 24 of a horse. Hoof 24 is in engagement with the outer surface of wall 22 (FIG. 2). The shoe 10 has nail holes 27 at certain locations in a groove 38 around the outer periphery of the shoe for receiving nails (not shown) which are driven into the hoof 24 to secure the shoe and the socks 16 and 18 to the hoof.

Sock 18 is of a suitable material which will allow a nail to pass through the material of the sock and into and through a hole 27 for penetration of the hoof 24. To observe the hole, the material of the sock is clear or translucent. To this end, the material of sock 18 is of a moldable material, such as rubber, neoprene or plastic, such as polyurethane and the like. The material is selected so that it can withstand rough treatment such as when the shoe of the horse strikes the ground as the horse moves forwardly.

The sock 18 in FIG. 2 has a ground engaging wall 28 including a first, inclined segment 31, a flat segment 33 and a second inclined segment 34 as shown in FIG. 2A. Segment 33 has a rib 36 which is received within groove 38 (FIG. 1) formed in the bottom surface of shoe 10. Groove 38 accommodates the heads of nails (not shown) driven into holes 27 in the shoe for securing the shoe 10 to the hoof 24 of the horse. Except for the thickness of segment 32, the thicknesses of walls 22 and 28 are substantially the same. The sock can be made in any suitable manner preferably by a compression molding technique. For race horses, the length is in the range of 1.5" to 2.5", more preferably around 2.0", and the sock is shaped to complementally receive the respective heel cover 14 of shoe 10. For use on another type of horse, the sock will have other dimensions.

The sock can be free of any projections on the lower surface of wall 28. In the alternative, the sock can have a block or projection 30 near the outer end 20 thereof (FIG. 5), or it can have a cleat or projection 32 on the outer surface of wall 28 at any location between or at the ends of the sock (FIG. 6). Both projections 30 and 32 are provided to give greater traction for the horse to which the shoe 10 is attached. Projections 30 and 32 are provided in situations where the track or path is muddy, and the projections dig into the mud to a greater degree than the sock would penetrate the mud without the projections, thereby stabilizing the horse as the horse moves through the mud. A projection 30 or 32 is preferably molded along with the sock.

FIG. 1 shows projection 32 in place on the lower surface of wall 28 of the sock between the ends of the sock. A projection 32 is also shown in dashed lines in FIG. 1 to show another location at which the projection can be used. The length of the projection 32 is in the range of 0.375" to 0.750" and its height is in the range of 0.250" to 0.500" as shown in FIGS. 6 and 7. Similarly, the width of projection 30 is approximately the width of the sock at the rear closed end 20 thereof, the outer end faces of projections 30 and 32 being substantially flat.

To offset the horse's hoof at an angle relative to ground, sock 18 is provided with a wedge-shaped lower wall 22a. The wedge shape of wall 22a is sometimes deemed necessary when the hoof surface is irregular. The wedge shape of wall 22a of the sock can be used in conjunction with the block heel 30 or the sticker/cleat 32 of FIGS. 4 and 6.

The present invention provides a yieldable adaptor in the form of a sock adapted to be placed over the heel of most standard shoes for race, saddle, plow and jumping horses. The sock enables the farrier to adapt the shoe to fit many purposes without removing the shoe from the horse's hoof.

If a sticker or cleat 32 of the type shown in FIGS. 1, 6 and 7 is used, it will give better traction to the horse's hoof in certain conditions, such as a muddy surface, a grassy surface and a sandy surface. In using the sticker or cleat 32, the sticker is used on the sock between the ends thereof.

The block heel or projection 30 (FIGS. 4 and 5) is used to raise the hoof heel of the horse's hoof so that the horse will not bruise the heel and to keep the horse's stifle strengthened.

The wedge-shaped wall 22a (FIG. 3) enables the farrier to raise one or both sides of shoe 10 on the hoof 24. This enables the farrier to avoid having to rasp off too much from one side of the hoof 24 so that the farrier cannot balance the hoof again.

In using the sock of the present invention and comparing its use with that of conventional horseshoes without socks, the sock is less severe to the hoof by being made out of plastic rather than abrasive, as a metal. After a horse, for instance has run in a race, the farrier only has to remove the heel nail to remove the sock from the shoe without having to remove the entire shoe itself. The farrier now has to twist and rasp off the sticker or cleat of the conventional shoe so that the horse will still not injure itself in the stall. Then, if the horse is going to run again within the next 7 to 10 days, the farrier would have to reshoe the horse using conventional shoes. In using the sock of the present invention, the farrier need only remove the heel nail and place the sock over the heel shoe and replace the heel nail. This procedure would save the outer wall of the hoof which becomes very thin due to the number of shoeings. Moreover, the use of the sock would reduce the cost of shoeing the horse.

The sticker or cleat on a conventional horseshoe for a race horse is approximately 1" from the heel. The sticker on the sock of the present invention can be located intermediate the ends of the sock as shown in FIGS. 6 and 7 or can be located at the heel as shown in FIGS. 4 and 5. This location is important for two reasons:

1) The heel of the horse's hoof strikes the ground before the toe. This would give the horse added traction over the conventional shoe.

2) The sticker or cleat of the conventional horseshoe is located in the wider part of the shoe, enabling the horse to hit the lower leg area of the hind legs.

The present invention provides a sock for a heel of a shoe in which the sock provides cost savings to the owner of the horse, time savings to the farrier, and a decrease in the number of injuries to the horse itself.

What is claimed is:

1. In combination: a horseshoe having a pair of heels with each heel having substantially the same cross section as the remaining part of the horseshoe; and at least one heel sock for placement on a heel of the horseshoe, said heel sock including a tubular body adapted to be fitted in an operative position over a heel of the horseshoe and having a first end with an opening for receiving said heel, the end opposite to said first end being closed to limit the extent to which the sock can be moved onto the heel, said body terminating in the plane of said opening at said first end, the body having an inner surface substantially complemental to and adapted to frictionally engage the outer surface of the adjacent part of the heel of the horseshoe when the body is in said operative position, said body being of a material capable of being pierced by a shoe nail, said body having upper and lower walls to be pierced by the shoe nail between the ends of the body so that the body and the horseshoe can be attached to a hoof of a horse by the shoe nail when the body is in said operative position over the heel of the horseshoe.

2. A heel sock as set forth in claim 1, wherein is included a projection on the lower wall of the body, said projection being integral with the body and extending downwardly therefrom.

3. A heel sock as set forth in claim 1, wherein the body has a normally lower wall, said lower wall being transversely wedge-shaped.

4. A heel sock as set forth in claim 3, wherein the wall becomes progressively thicker as the opposite end of the sock is approached.

5. For use with a horseshoe having a pair of heels with each heel having substantially the same cross section as the remaining part of the horseshoe, and the horseshoe having a normally flat upper surface and a normally lower surface provided with a central groove therein extending between the heels, a heel sock for the horseshoe comprising:

a tubular body adapted to be fitted in an operative position over a heel of the horseshoe and having a first end with an opening for receiving said heel, the end opposite to said first end being closed to limit the extent to which the sock can be moved onto the heel, said body having an elongated rib integral with and within the body said rib being received within said groove of the horseshoe when the body is in said operative position, said body terminating in the plane of said opening at said first end, the body having an inner surface substantially complemental to and adapted to frictionally engage the outer surface of the adjacent part of the heel of the horseshoe when the body is in said operative position, said body being of a material capable of being pierced by a shoe nail, said body having upper and lower walls to be pierced by the shoe nail between the ends of the body so that the body and the horseshoe can be attached to a hoof of a horse by the shoe nail when the body is in said operative position over the heel of the horseshoe.

6. A heel sock as set forth in claim 5, wherein is included a projection on the lower wall of the body, said projection being integral with the body and extending downwardly therefrom.

7. A heel sock as set forth in claim 5, wherein the body has a normally lower wall, said lower wall being transversely wedged-shaped.

8. A heel sock as set forth in claim 7, wherein the wall becomes progressively thicker as the opposite end of the sock is approached.

* * * * *